US011727496B1

(12) United States Patent
Warden et al.

(10) Patent No.: US 11,727,496 B1
(45) Date of Patent: *Aug. 15, 2023

(54) SOCIAL NETWORK RISK ANALYSIS

(71) Applicant: Allstate Insurance Company, Northbrook, IL (US)

(72) Inventors: Thomas Warden, Belmont, CA (US); Christian Peccei, Palo Alto, CA (US)

(73) Assignee: Allstate Insurance Company, Northbrook, IL (US)

( * ) Notice: Subject to any disclaimer, the term of this patent is extended or adjusted under 35 U.S.C. 154(b) by 185 days.

This patent is subject to a terminal disclaimer.

(21) Appl. No.: 17/093,834

(22) Filed: Nov. 10, 2020

Related U.S. Application Data

(63) Continuation of application No. 16/122,165, filed on Sep. 5, 2018, now Pat. No. 10,861,103, which is a continuation of application No. 15/281,586, filed on Sep. 30, 2016, now Pat. No. 10,121,206, which is a continuation of application No. 14/341,173, filed on Jul. 25, 2014, now Pat. No. 9,483,795, which is a continuation of application No. 13/034,043, filed on Feb. 24, 2011, now Pat. No. 8,799,028.

(51) Int. Cl.
*G06Q 40/08* (2012.01)
*G06Q 50/00* (2012.01)

(52) U.S. Cl.
CPC ............ *G06Q 40/08* (2013.01); *G06Q 50/01* (2013.01)

(58) Field of Classification Search
CPC .............................. G06Q 40/08; G06Q 50/01
USPC ....................................................... 705/3–44
See application file for complete search history.

(56) References Cited

U.S. PATENT DOCUMENTS

| 7,945,512 B2 | 5/2011 | Scipioni et al. |
| 8,060,386 B2 | 11/2011 | Stevenson et al. |
| 8,069,467 B1 | 11/2011 | Ogilvie |
| 8,370,895 B2 | 2/2013 | DiCrescenzo et al. |
| 8,438,089 B1 | 5/2013 | Wasserblat et al. |
| 8,578,501 B1 | 11/2013 | Ogilvie |

(Continued)

FOREIGN PATENT DOCUMENTS

| WO | 2009079394 A1 | 6/2009 |
| WO | 2010/062899 A1 | 6/2010 |

OTHER PUBLICATIONS

Gashami et al., "Social-media-based risk communication for data co-security on the cloud", Industrial Management & Data Systems, vol. 120, No. 3, pp. 442-463, Emerald Publisihing Limited 0263-5577 (Year: 2020).*

(Continued)

*Primary Examiner* — Frantzy Poinvil
(74) *Attorney, Agent, or Firm* — Polsinelli PC

(57) ABSTRACT

An enhanced social network module associated with an entity may create a social network for an individual, group, and/or organization. The module may then use the social network to determine risk associated with insuring a member of the social network. The determined risk may be used to calculate a rate for insuring the member. Additional features of the module may allow for the calculation of a group rate for insuring all members of the social network, the calculation of various centrality measures for each member of the social network, the calculation of a trust score for any given member, and the ability to poll members of the social network to determine various characteristics of any given member.

20 Claims, 5 Drawing Sheets

(56) References Cited

U.S. PATENT DOCUMENTS

| | | | |
|---|---|---|---|
| 8,604,357 | B2 | 12/2013 | Takeda |
| 8,639,603 | B2 | 1/2014 | Denning et al. |
| 8,678,501 | B2 | 3/2014 | Jockel |
| 8,694,401 | B2 | 4/2014 | Stewart |
| 8,781,850 | B2 | 7/2014 | Bazzani et al. |
| 8,799,028 | B1 | 8/2014 | Warden et al. |
| 8,799,125 | B2 | 8/2014 | Schumann, Jr. |
| 8,812,958 | B2 | 8/2014 | Willis et al. |
| 8,856,043 | B2 | 10/2014 | Faith et al. |
| 9,483,795 | B1 | 11/2016 | Warden et al. |
| 9,672,492 | B2 | 6/2017 | Peak et al. |
| 9,679,469 | B2 | 6/2017 | Lin et al. |
| 9,697,469 | B2* | 7/2017 | McMahon ............. G06N 20/20 |
| 10,719,779 | B1* | 7/2020 | Sagduyu ............. G06F 16/9024 |
| 2007/0100595 | A1 | 5/2007 | Earles et al. |
| 2008/0146334 | A1 | 6/2008 | Kil |
| 2008/0288298 | A1 | 11/2008 | Dattatreya et al. |
| 2009/0217342 | A1 | 8/2009 | Nadler |
| 2009/0248434 | A1 | 10/2009 | Pfeffer et al. |
| 2009/0271289 | A1 | 10/2009 | Klinger et al. |
| 2010/0100398 | A1 | 4/2010 | Auker et al. |
| 2011/0004483 | A1* | 1/2011 | Ting ...................... G06F 16/951 707/E17.108 |
| 2011/0161119 | A1* | 6/2011 | Collins .................. G06Q 40/08 705/4 |
| 2011/0197255 | A1 | 8/2011 | DiCrescenzo et al. |
| 2011/0238451 | A1 | 9/2011 | Bazzani et al. |
| 2012/0179764 | A1* | 7/2012 | Erdal .................... H04L 63/102 709/206 |
| 2012/0191596 | A1* | 7/2012 | Kremen ................. G06Q 40/02 705/38 |
| 2012/0221357 | A1 | 8/2012 | Krause et al. |
| 2012/0233256 | A1* | 9/2012 | Shaham ................ G06Q 30/02 709/204 |
| 2012/0245963 | A1 | 9/2012 | Peak et al. |
| 2013/0066656 | A1 | 3/2013 | Hanson et al. |
| 2013/0212479 | A1 | 8/2013 | Willis et al. |
| 2013/0275212 | A1 | 10/2013 | Agarwal |
| 2013/0305336 | A1 | 11/2013 | Konertz et al. |
| 2013/0317860 | A1 | 11/2013 | Schumann, Jr. |
| 2013/0325517 | A1 | 12/2013 | Berg |
| 2013/0339065 | A1 | 12/2013 | Denning et al. |
| 2014/0019389 | A1* | 1/2014 | Abbas ..................... G06N 5/04 706/46 |
| 2014/0046724 | A1* | 2/2014 | Neag .................. G06Q 30/0203 705/7.32 |
| 2014/0114694 | A1 | 4/2014 | Krause et al. |
| 2014/0129261 | A1 | 5/2014 | Bothwell et al. |
| 2014/0164218 | A1 | 6/2014 | Stewart |
| 2014/0280568 | A1* | 9/2014 | Postrel .................... H04L 67/02 709/204 |
| 2015/0032481 | A1 | 1/2015 | Norling-Christensen et al. |
| 2015/0032510 | A1* | 1/2015 | Farahat .............. G06Q 30/0205 705/7.34 |
| 2015/0161538 | A1 | 6/2015 | Matus et al. |
| 2015/0220862 | A1 | 8/2015 | De Vries et al. |
| 2016/0180456 | A1 | 6/2016 | Hochstatter et al. |
| 2016/0253688 | A1 | 9/2016 | Nielsen et al. |
| 2017/0069035 | A1 | 3/2017 | Quinlan et al. |
| 2017/0262451 | A1* | 9/2017 | Milner .................. G06F 16/285 |
| 2020/0126174 | A1* | 4/2020 | Halse ................... G06Q 50/265 |

OTHER PUBLICATIONS

Camber, Rebecca. "Facebook and Twitter user face pricier insurance as burglars 'shop for victims' personal details on networking sites," retrieved online at: http://www.dailymail.co.uk/news/article-1209338/Internet-shopping-burglars-Facebook-Twitter-users-face-pricier-insurance.html, Aug. 27, 2009, pp. 1-7.

Conley, Lucas. "How Rapleaf Is Data-Mining Your Friend List to Predict Your Credit Risk," Nov. 16, 2009, pp. 1-5.

Evans, Richard. "Using Facebook or Twitter 'could raise your insurance premiums by 10pc,'" retrieved online at: http://www.telegraph.co.uk/finance/personalfinance/insurance/7269543/Using-Facebook-or-Twitter-could-raise-your-insurance-premiums-by-10pc.html, Feb. 19, 2010, pp. 1-7.

Gibbs, Mark. "I don't bleepin' believe it," retrieved online at: http://www.networkworld.com/columnists/2010/022610-backspin.html, Feb. 26, 2010, pp. 1-2.

Skinner, Cary-Ann. "Twitter users face higher insurance premiums," http://www.networkworld.com/news/2010/022310-twitter-users-face-higher-insurance.html, Feb. 23, 2010, pp. 1-2.

Terdiman, Daniel. "Lenders Using Social Networks to Assess Applicants?," retrieved online at: http://news.cnet.com/8301-13772_3-10439850-52.html, Jan. 22, 2010, pp. 1-3.

"The Effect Social Networking Has on Auto Insurance," retrieved online at: http://www.goinsurancerates.com/auto-insurance/the-effect-social-networking-has-on-auto-insurance/, Mar. 11, 2010, pp. 1-3.

Williams, Geoff. "Could Your Social Media Habits Raise Your Home Insurance Premiums?" retrieved online at: http://www.walletpop.com/2010/02/25/could-your-social-media-habits-raise-your-home-insurance-premium/, Feb. 25, 2010, pp. 1-8.

Chordas, Lori. "Strength in Numbers," Best's Review, Jan. 2010, pp. 20-25.

Defigueiredo, Dimitri Do B. et al. "TrustDavis: A Non-Exploitable Online Reputation System," IEEE, 2005, pp. 1-10.

Lai, Kuei-Kuei et al. "The Isomorphic Development of Insurance," PICMET 2007 Proceedings, Aug. 5-9, 2007, pp. 1564-1570, Portland, OR.

Weng, Calvin S. et al. "Core/Periphery Structure of the Technological Network," PICMET 2009 Proceedings, Aug. 2-6, 2009, pp. 56-60, Portland, OR.

Fitzgerald, Mike. "Can Social Networking Aid Underwriting?" retrieved online at: http://www.insurancenetworking.com/blogs/insurance_technology_underwriting_social_networking_pricing-24602-1.html, Apr. 15, 2010, retrieved Jan. 14, 2011, pp. 1-2.

Orgnet, LLC, Social Network Analysis, A Brief Introduction, http://www.orgnet.com/sna.html, 3 pp., Valdis Krebs, 2000.

Sep. 23, 2015—U.S. Final Rejection—U.S. Appl. No. 14/341,173.
Mar. 25, 2015—U.S. Non Final Rejection—U.S. Appl. No. 14/341,173.
Mar. 28, 2012—U.S. Non Final Rejection—U.S. Appl. No. 13/034,043.
Aug. 24, 2012—U.S. Final Rejection—U.S. Appl. No. 13/034,043.
Dec. 19, 2013—U.S. Non Final Rejection—U.S. Appl. No. 13/034,043.
Apr. 14, 2014—U.S. Notice of Allowance—U.S. Appl. No. 13/034,043.
Apr. 5, 2016—U.S. Final Office Action—U.S. Appl. No. 14/341,173.
Jul. 1, 2016—U.S. Notice of Allowance—U.S. Appl. No. 13/341,173.
Nov. 28, 2017—U.S. Non-Final Office Action—U.S. Appl. No. 15/281,586.
Jun. 6, 2018—U.S. Notice of Allowance—U.S. Appl. No. 15/281,586.
Ha Y., "In Few Years, Social Network Data May Be Used in Underwriting," Insurance Journal, Oct. 13, 2011, Retrieved from URL: https://www.insurancejournal.com/news/national/2011/10/13/219764.htm On Oct. 10, 2018, 10 Pages.

* cited by examiner

SOCIAL NETWORK RISK ANALYSIS

CROSS REFERENCE TO RELATED APPLICATIONS

This application is a continuation of and claims priority to U.S. patent application Ser. No. 16/122,165, now U.S. Pat. No. 10,861,103, filed Sep. 5, 2018, which is a continuation of U.S. patent application Ser. No. 15/281,586, now U.S. Pat. No. 10,121,206, filed Sep. 30, 2016, which is a continuation of U.S. patent application Ser. No. 14/341,173, now U.S. Pat. No. 9,483,795, filed Jul. 25, 2014, which is a continuation of U.S. patent application Ser. No. 13/034,043, now U.S. Pat. No. 8,799,028, filed Feb. 24, 2011, the contents of each of which are incorporated herein by reference in their entirety.

TECHNICAL FIELD

Aspects of the disclosure generally relate to the creation and use of social network data. In particular, various aspects of the disclosure allow for a social network to be used to assess risk.

BACKGROUND

Social networks link people that share common interests and habits. The rapid growth of the Internet has facilitated the ability of social networks to connect people all across the world. Entities such as individuals, groups, and organizations now use social networks to share ideas, collaborate on projects, find job opportunities, and establish personal relationships, among other things.

An entity may become a part of a social network by providing information about itself to others already in a network. For instance, through many Internet networking sites, an individual is linked to a list of friends based on various factors, including a past relationship, a shared interest, a similar job, a similar age, etc.

As social networks have become more pervasive, the amount of data describing members of any given network has ballooned. However, adequate techniques for analyzing this data to provide information about the members of the network have yet to be developed.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable media, and apparatuses for creating a social network and using data derived from a social network. The data may be used to assess risk associated with members within the network.

With another aspect of the disclosure, social network data may be used to determine a group rate that may apply to members within a community of the social network.

With yet another aspect of the disclosure, centrality measures may be determined based on the roles of members within a community of the social network.

Aspects of the disclosure relate to determining and using a trust score for a member within a community of the social network.

Other aspects of the disclosure relate to the use of a social network to implement a peer review process through which members within a community of the social network rate each other.

Aspects of the disclosure may be provided in a computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which.

DETAILED DESCRIPTION

Figure 1:
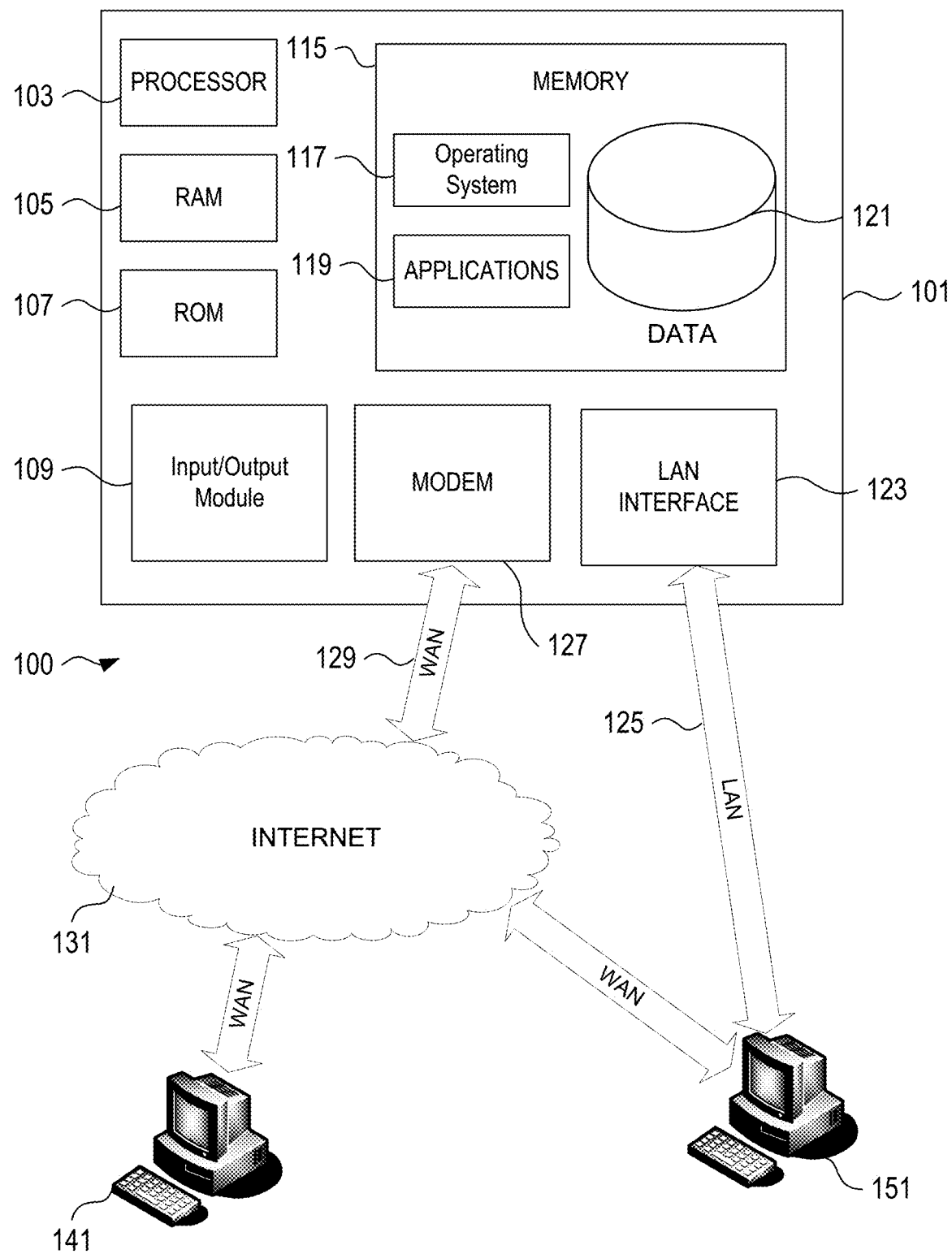
FIG. 1 shows an illustrative operating environment in which various aspects of the disclosure may be implemented.

As discussed above, current techniques for analyzing social network data to provide information about the members of the network are limited.

In accordance with various aspects of the disclosure, methods, computer-readable media, and apparatuses are disclosed in which members of a community within a social network may be identified for the purpose of a risk assessment associated with the community. The social network may include entities that are related to one another in various ways. Meanwhile, the community may include members within the social network that share links with each other. For instance, any two individuals (e.g., friends) may be "linked" together on social networking websites through mutual consent of both individuals. The community structure may be established through the use of various algorithms, including those derived from graph theory, among other methodologies. In some aspects, the community structure may resemble an affinity group.

Once a community structure is established, the structure may be analyzed to determine risk associated with a member of the community or the community itself. In one embodiment, the community structure may resemble a network of nodes representing each member of the community with lines connecting the members where appropriate. This risk assessment may be used for various purposes, including for the determination of an insurance rate. For a given member within a community, other members connected to this member may be known as contacts or connections, among other things.

Based on the community structure, various factors may be established and weighted appropriately for determining a price in insuring a member of the community. For instance, factors that may be considered in determining the insurance rate (e.g., auto, home, etc.) for a given member include the average age of contacts, the proportion of contacts that may be male and/or female, the average number of accidents per contact, location of the contacts, and proportion of contacts who smoke, among other things.

Other specific factors that may be considered in determining the insurance rate include the zip code of the contacts, marital status of contacts, the type of vehicle (e.g., economy, luxury, new, old, make, model, etc.) that contacts may own, the number of young drivers that may drive contacts' vehicles, the deductible amount applied to contacts' insurance policies, the status (e.g., reside at college, commute from home, good student, etc.) of students on contacts' insurance policies, the completion of drivers' education classes by people associated with contacts' insurance policies, the presence of passive restraints (e.g., airbags, motorized belts, etc.) within contacts' vehicles, the number and date of accidents claimed by contacts through their insurance policies, the dollar value amount of loss claimed by contacts, the number of minor violations committed by contacts, the number of inexperienced operators of vehicles operated by contacts, the number of driving under the influence (DUI), felony, and/or reckless driving convictions for the contacts, the number of vehicles owned by contacts used to service a ranch or farm (e.g., for a farm discount), the presence and number of temporary living quarters (e.g., camper units, recreational vehicles, etc.) attached to vehicles owned by contacts, the presence of passive/active anti-theft systems attached to insured items owned by contacts, the employment status of contacts, the completion of defensive driver courses by contacts, the credit score of contacts, the number of different insurance policies owned by contacts (e.g., for a multi-policy discount), the presence of anti-locked brakes in contacts' vehicles, the company that employs contacts (e.g., employee of insurance company in question, preferred partner company, etc.), whether or not contacts have had prior insurance policies with the insurance company in question, the use of electronic funds transfer for payment of insurance premiums by contacts, and/or the type of insurance policy (e.g., premium, discount, low-end, high-end, old form, new form, etc.) purchased by the contacts.

Additional factors considered may include the state of contacts' homeownership, the replacement cost of contacts' homes, the presence of primary and secondary residences for a member's contacts, the age of contacts' homes, the number of non-weather related claims and the dates/times in which those claims were made by contacts, the number of occupants within contacts' homes, the type of construction of occupants' homes (e.g., brick, wood, etc.), the classification of the town in which contacts' homes are located, the presence of protective devices (e.g., alarm systems, etc.) located within contacts' homes, the type of roof employed in contacts' homes, the distance of contacts' homes to a fire department, whether contacts' homes are bought or rented, the number of times contacts have renewed their insurance policies, and/or the general location of contacts' homes.

Some or all of this data may be obtained from various sources, including data volunteered by one or more members of the community structure, from phone records, from text messages, from family members, from a profile network created by an entity (e.g., an insurance company) interested in obtaining the data, from professional associations, from social media internet websites, from internet-based chats, blogs, and tweets, and from other organizations/corporations. An entity (e.g., an insurance company) interested in obtaining this information about members of a social network may provide discounts on services/goods (e.g., discounts on premiums associated with insurance policies) if access is provided to relevant information about a member of the social network.

In general, each of the aforementioned factors may apply to a variety of insurance policies, including home, life, auto, fire, health, etc. While all of the factors mentioned above have been applied to characteristics possessed by a member's contacts, one of ordinary skill in the art would also understand that these and other factors may also apply directly to a given member in assessing the member's insurance rate. In addition, the aforementioned factors are purely exemplary and one of ordinary skill in the art would recognize that additional factors may be applied to determining an insurance rate for a given community member.

In accordance with other aspects of the disclosure, an enhanced social network module (e.g., a computing device) may aid in identifying an entity's social network (e.g., a community structure) and in analyzing and using data derived from the network for assessing risk associated with insuring the entity (e.g., an individual, organization, group, etc.).

FIG. 1 illustrates a block diagram of an enhanced social network module 101 (e.g., a computer server) in communication system 100 that may be used according to an illustrative embodiment of the disclosure. The device 101 may have a processor 103 for controlling overall operation of the enhanced social network module 101 and its associated components, including RAM 105, ROM 107, input/output module 109, and memory 115.

I/O 109 may include a microphone, keypad, touch screen, and/or stylus through which a user of enhanced social network module 101 may provide input, and may also include one or more of a speaker for providing audio output and a video display device for providing textual, audiovisual and/or graphical output Software may be stored within memory 115 and/or storage to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to generate a social network community structure for a particular individual and analyze the structure to determine risk associated with insuring the individual. For instance, processor 103 may assign different weights to different characteristics of an individual's contacts in determining the insurance rate associated with the individual. In addition, processor 103 may aid in calculating various centrality measures for gaining insight into the roles played by the members of a community structure. Further still, processor 103 may aid in calculating a trust score for a member of a community structure and/or in implementing a peer review process for assessing a given member's risk.

The server 101 may operate in a networked environment supporting connections to one or more remote computers, such as terminals 141 and 151. The terminals 141 and 151 may be personal computers or servers that include many or all of the elements described above relative to the computing device 101. Alternatively, terminal 141 and/or 151 may be data stores for storing information related to a community member's contacts. The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced social network module 101 according to an illustrative embodiment of the disclosure may include computer executable instructions for invoking functionality related to creating, analyzing, and using a community member's social network for determining the risk associated with insuring the member.

Enhanced social network module 101 and/or terminals 141 or 151 may also be mobile terminals including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
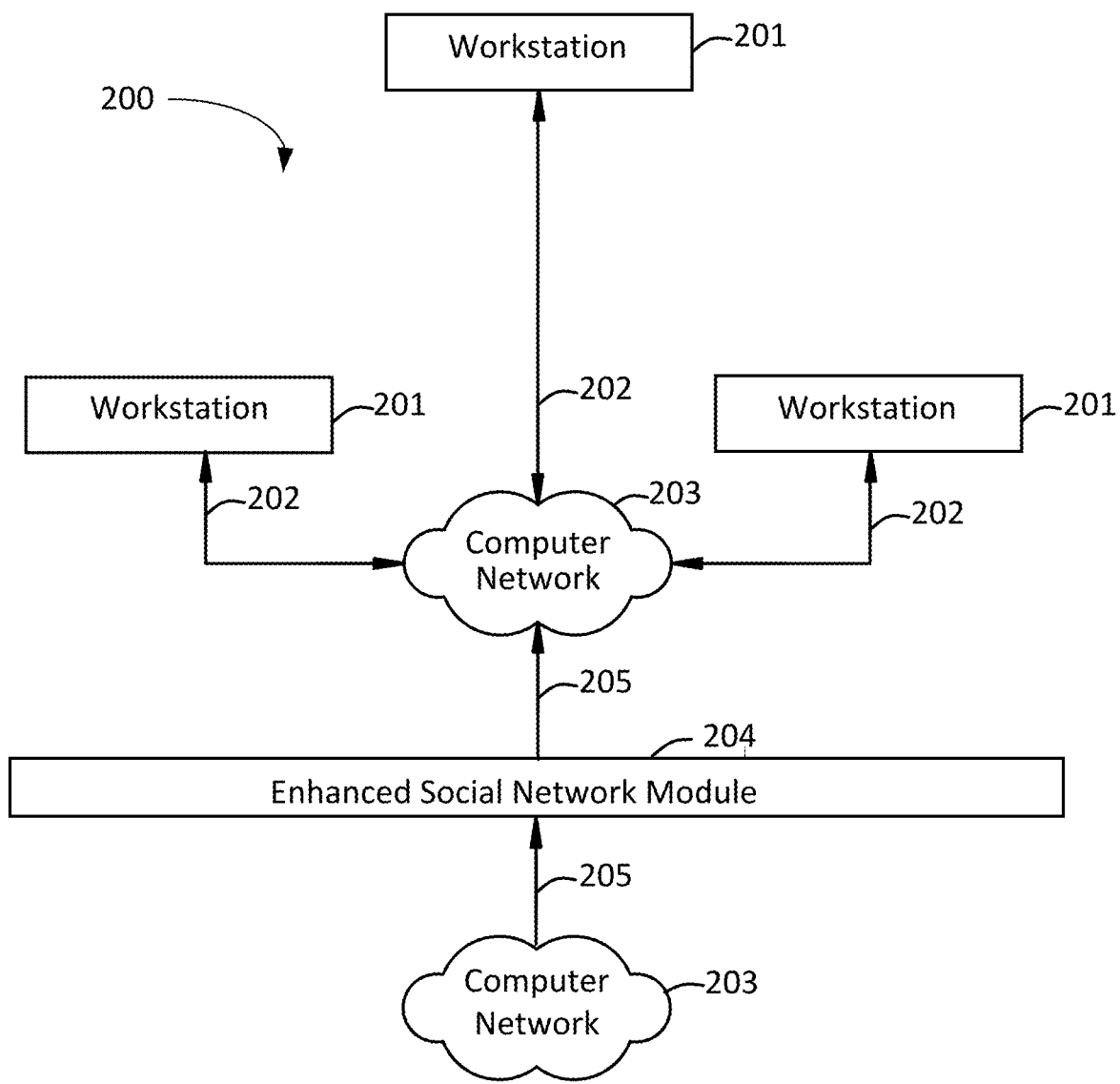
FIG. 2 is an illustrative block diagram of workstations and servers that may be used to implement the processes and functions of certain aspects of the present disclosure.

Referring to FIG. 2, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to enhanced social network module 204. In certain embodiments, workstations 201 may run different algorithms used by module 204 for generating a community structure, or, in other embodiments, workstations 201 may be different points at which the enhanced social network module 204 may be accessed. In system 200, enhanced social network module 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The steps that follow in the Figures may be implemented by one or more of the components in FIGS. 1 and 2 and/or other components, including other computing devices.

Figure 3:
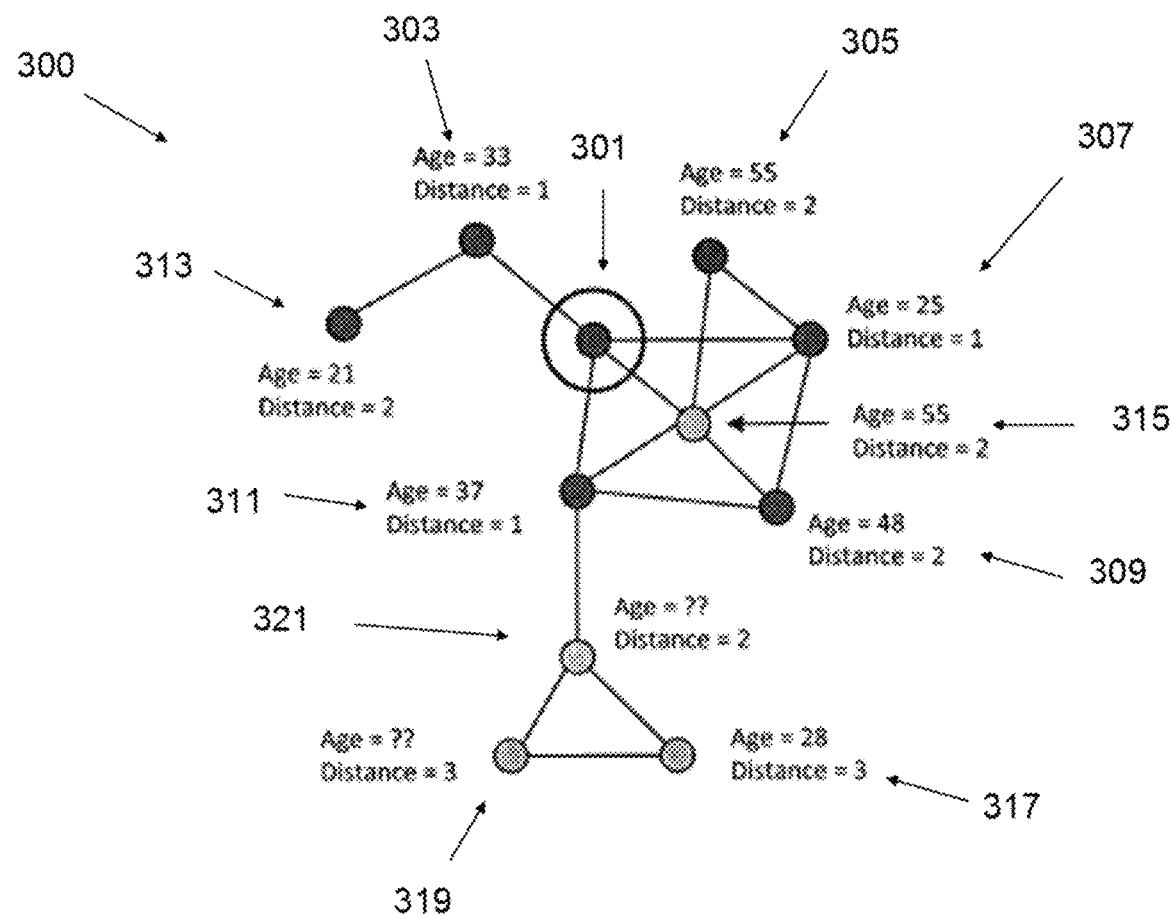
FIG. 3 shows an exemplary community structure/social network generated by a social network module in accordance with various aspects of the disclosure.

FIG. 3 shows an exemplary community structure/social network 300 generated by social network module 101. Community structure 300 includes various members 303-321 that may be a part of a community for member 301. As mentioned previously, member 301 may be an individual, group, organization, etc. whose risk may be assessed by social network 300. This risk assessment may be performed by a variety of entities, including an individual, insurance company, or any other organization. In the example of FIG. 3, a member 301-321 may be indicated by a circle and a line between any two members 301-321 may indicate that these two members 301-321 may be connected to one another. In other cases, a member 301-321 and a connection between members 301-321 may be represented in other ways in structure 300.

As an example, if an insurance company is conducting a risk assessment of member 301, members 303-313 may include current policyholders at the insurance company and members 315-321 may include non-policyholders at the insurance company. Within the structure 300 of FIG. 3, current policyholders 303-313 are indicated with a darkly shaded circle and non-policyholders 315-321 are indicated with a lightly shaded circle. These and other designations may be indicated in any number of ways in structure 300 (e.g., other shapes, lines, etc.). In the example of FIG. 3, an insurance company may already possess insurance rate-determining information for the current policyholders 303-313 and little (e.g., information available by using a social security number) or no insurance rate-determining information for non-policyholders 315-321. Also, in the example of FIG. 3, most members 303-321 within the community of member 301 have an age displayed in structure 300. Of course, one of ordinary skill in the art would appreciate that other information about members 301-321, as detailed above, may be displayed and/or analyzed in structure 300. In the example of FIG. 3, the age of member 301 used in calculating risk associated with insuring member 301 may be estimated by averaging all the ages of members 303-321. In some embodiments, the age of member 301 used in calculating risk associated with insuring member 301 may be estimated by inverse-distance weighting the average age of member 301's contacts.

In one embodiment, the distance between contacts may be the number of "jumps" that are made to move from one contact to another along the links interconnecting the contacts. For the example shown in FIG. 3 for member 301, members 303, 307, and 311 are the closest to member 301 (distance=1); therefore, their ages may be given the highest weight in computing member 301's age. Similarly, members 305, 309, 313, 315, and 321 are one "jump" further away from member 301 (distance=2); therefore, their ages may be given a lower weight in computing member 301's age. Finally, the ages of members 317 and 319 may be given an even lower weight in computing member 301's age, given that members 317 and 319 are three "jumps" away (distance=3) from member 301.

Weights may be assigned in various ways; for instance, in the example shown in FIG. 3, members 303, 307, and 311 may be given a weight of three, members 305, 309, 313, 315, and 321 may be given a weight of two, and members 317 and 319 may be given a weight of one in an inverse distance relationship. The rate of drop-off in the weights as distance increases may be tuned for maximum predictive accuracy. For this example, these weights may be applied as a multiplicative factor in determining the average age of member 301. In other examples, other weighting methodologies may be implemented.

In some embodiments, information about certain members 301-321 may not be available. In this case, these members 301-321 may be excluded in calculations involving other members of a social network 300. For instance, in the example of FIG. 3, the average age of members 319 and 321 is not available and is denoted by the symbol "??" in graph 300. Thus, the ages of members 319 and 321 may be excluded in the calculation of member 301's estimated age. In other embodiments, when information about members 301-321 is not available, this information may be approximated and/or otherwise furnished.

It should be noted that although the information in structure 300 is well-defined, in most real-world scenarios, structure 300 may be much more constrained and incomplete. For instance, relevant characteristics of members 301-321 may be unknown, including information about whether certain members 301-321 may be linked to other members 301-321 in structure 300.

Figure 4:
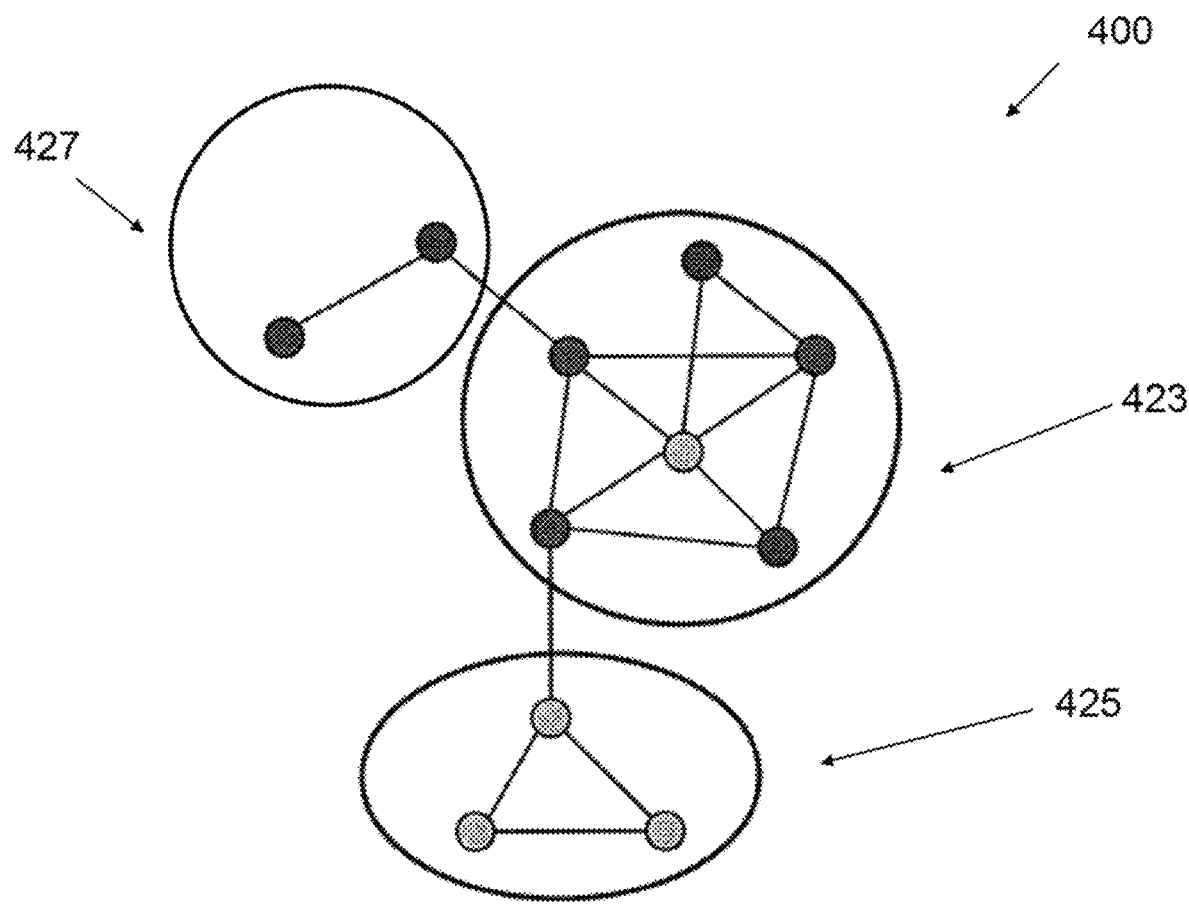
FIG. 4 shows a main community structure divided into sub communities in accordance with various aspects of the disclosure.

FIG. 4 shows a main community structure 400 divided into sub communities 423, 425, and 427. The sub communities 423, 425, and 427 may comprise members that are more strongly linked than the members taken as a whole in main community structure 400. The algorithm may be enhanced to identify groups who all share a similar characteristic (e.g., own a certain type of car, went to the same college, etc.) to generate sub communities 423, 425, and 427.

Structure 400 or sub communities 423, 425, and 427 may be used to determine a group insurance rate for multiple members. A group insurance rate may have several advantages for both the entity tasked with determining the group rate (e.g., an insurance company) and for the members of structure 400. For instance, the group insurance rate may allow members of the group to enjoy a lower rate as members of the group than the rate these members would obtain if they bought their policy individually. The group policy may also produce lower variability in losses for the group than for a single member, which allows an entity (e.g., an insurance company) to accurately predict the correct insurance rate. In addition, the group policy may also result in "peer motivation" amongst the group to reinforce safer behavior and avoid claims which would change everyone's premium for an insurance policy. In certain aspects, the determination of a group insurance rate may involve smoothing out the rates obtained by individual members.

In addition, an entity may allow the members within groups 400 and/or 423, 425, and/or 427 to compete against one another. For example, the top five people in the group may obtain a reward. As information about one member of a group may be made available to other members of the group, the group dynamics may be such that each member of the group is motivated by others within the group to avoid behavior, situations, etc. that increases the group rate.

In addition, an entity (e.g., an insurance company) may use structure 400 to explain to potential customers how they share a common bond (e.g., link) with other members in structure 400 to help during a sales/marketing process.

Figure 5:
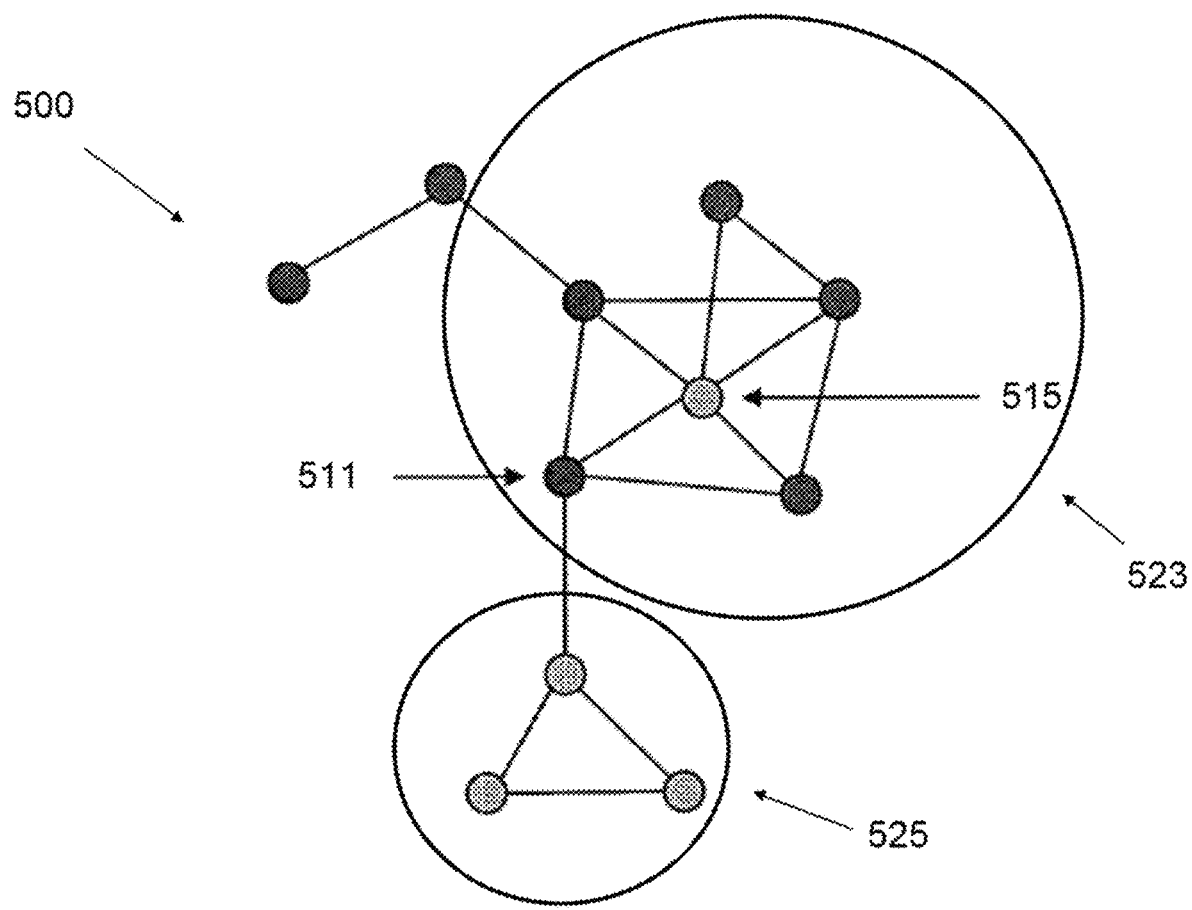
FIG. 5 shows a community structure that depicts various centrality measures for a social network in accordance with various aspects of the disclosure.

FIG. 5 shows a community structure 500 that depicts various centrality measures for a social network 500 to provide insight into various roles and groupings within structure 500. For instance, centrality measures may determine which members may play such roles as "connectors," "mavens," "leaders," "bridges," and "isolates," among other things. In addition, centrality measures may give insight into which parts of structure 500 are the clusters, which members are in the clusters, which members are at the core of structure 500, and which members are on the periphery of structure 500.

For instance, a member 511 may have high "betweeness centrality," meaning that member 511 may connect two separate sub communities 523 and 525 of members within structure 500. In this way member 511 may act as an information broker, controlling the flow of information between groups 523 and 525. In this particular example, one of the groups that member 511 connects (group 525) does not have any members that are currently associated with an entity such as an insurance company (indicated by the lightly shaded circles for members in group 525.) In this case, broker 511 may serve as a valuable entry point into a potential source of new customers for the entity.

In addition, member 515 may have high "degree centrality," meaning that member 515 may connect to many other members of structure 500. As a result, member 515 may act as an "influencer" of many other members in structure 500. In this example, member 515 may not currently be associated with an entity (e.g., a non-policyholder at an insurance company), as indicated by the lightly shaded circle for member 515. However, if member 515 were already associated with the entity, member 515 may be a good candidate to recruit as a "promoter" of the entity within social network 500. Because member 515 may not currently be associated with the entity, member 515 may easily be acquired as a customer of the entity by informing member 515 that many of his connections are currently associated with the entity (e.g., policyholders at an insurance company). A discussion of these and other centrality measures as well as other concepts that may be applied to structure 500 may be found at http://www.orgnet.com/sna.html.

In addition, a trust score for a member of structure 500 may be built based upon the length of time that the member and/or the member's contacts have been associated with an entity (e.g., an insurance company). For example, if the entity is an insurance company, the trust score for a given member may be based on the average number of times a policy is renewed by contacts within the member's community structure/social network 500 (number of times renewed=NTR). The rationale behind this method may be that if a given member's contacts are associated with the entity for a long period of time, this member may be given more trust by the entity as a result of the association with these contacts within the social network 500.

The trust score may be used in various ways. For instance, if the entity is an insurance company or other similar entity, the trust score may be used to help validate "self-handled" claims. In this case, the insurance company's claim handling costs and cycle times may be significantly reduced by having customers handle some aspects of their own claims (e.g., by allowing customers to take photos of the damage and transmitting them to the insurance company). To avoid claim fraud, only customers with a trust score above a certain threshold may be allowed to self-handle claims. In return, these customers may be rewarded with a lower insurance premium.

The trust score may also serve as a powerful variable for predicting claim fraud because members of structure 500 with many contacts/connections to those in good standing with an entity such as an insurance company may be less likely to defraud the insurance company.

The trust score may also function as a product or customer service tiering variable. For instance, members of community 500 with high trust scores may be offered a different choice of products or different service levels.

One of ordinary skill in the art would recognize that while the implementation of the trust score and other aspects of the disclosure have been described with regard to how an insurance company may implement/use these concepts, any entity, including individuals, schools, and other organizations, may implement these and other aspects of the disclosure. For instance, a school may implement the trust score to determine which students are most disciplined or a bank may use a similar concept to determine which individuals are most credit worthy.

Aspects of the disclosure also allow for polling of contacts within a given member's social network 500. Through a peer review process, the polls may allow the member's contacts to vote on how good the member is with regard to some characteristic of interest to an entity conducting the poll and/or implementing the social network 500. For instance, a hospital may implement this aspect of the disclosure to determine which doctor possesses required skills in a medical specialty. Alternatively, an insurance company may implement this process to determine a member's driving skills/performance record (e.g., speeding tickets, driver's education, etc.). The results of the peer review process may be used for rating purposes (e.g., for determining price associated with an insurance premium) or to provide conveniently aggregated, impartial feedback to the member in order to aid the member in improving an aspect (e.g., driving behavior) related to the substance of what is being reviewed by a member's community 500.

In some embodiments, contacts that participate in the polling process may earn certain rewards. The peer review process may implement any number of scoring/rating methodologies. For instance, the top 25% of the members within a network 500 may receive As, the next 25% may receive Bs, the next 25% may receive Cs, and the final 25% may receive Ds. In some embodiments, if one member of the group 500 increases a score related to characteristics of interest to an entity, the entire group 500 may benefit with reduced prices for services/goods offered by the entity. In other embodiments, only the member of group 500 that increased the score may benefit with reduced prices for services/goods offered by the entity.

In certain embodiments, telematics devices (e.g., in automobiles) may be used to obtain data about members in the group 500.

In certain aspects, if members of community structure 500 attempts to "game" the methods and systems discussed herein (e.g., by selectively choosing "friends") to appear more attractive to an entity, the entity may implement various correction mechanisms to take into account suspicious activity associated with these members (e.g., correct for people who are "de-friending" (e.g., getting rid of friends/contacts) excessively).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:
    generating, by a first computing device and using data received from a server hosting a social network website, a social network community graph for an entity, wherein the social network community graph connects the entity to a first community member who is connected to a plurality of other community members;
    identifying, by the first computing device, one or more characteristics of interest to the entity;
    receiving, by the first computing device and from one or more second computing devices associated with one or more other community members of the plurality of other community members, feedback on at least one characteristic of interest, of the one or more characteristics of interest, for the first community member;
    computing, by the first computing device and based on the received feedback on the at least one characteristic of interest, a peer review score for the first community member; and
    determining, by the first computing device and based on the peer review score for the first community member, a rate for insuring the first community member.

2. The method of claim 1, further comprising:
    adjusting, by the first computing device and based on the peer review score for the first community member, a price for a product or service offered to the first community member.

3. The method of claim 1, further comprising:
    adjusting, by the first computing device and based on the peer review score for the first community member, a price for a product or service offered to the first community member and to each of the plurality of other community members.

4. The method of claim 1, further comprising:
    determining, by the first computing device and based on receiving the feedback from the one or more other community members, a discount or reward to offer the one or more other community members.

5. The method of claim 1, further comprising:
    aggregating, by the first computing device, the received feedback; and
    sending, by the first computing device and to a computing device associated with the first community member, the aggregated feedback.

6. The method of claim 1, wherein computing the peer review score is further based on a length of time that the plurality of other community members connected to the first community member have been associated with the entity.

7. The method of claim 1, wherein the one or more characteristics of interest comprise at least one of: a driving skill, a driving behavior, or a professional skill.

8. A first computing device comprising:
one or more processors; and
memory storing computer-readable instructions that, when executed by the one or more processors, cause the first computing device to:
generate, using data received from a server hosting a social network website, a social network community graph for an entity, wherein the social network community graph connects the entity to a first community member who is connected to a plurality of other community members;
identify one or more characteristics of interest to the entity;
receive, from one or more second computing devices associated with one or more other community members of the plurality of other community members, feedback on at least one characteristic of interest, of the one or more characteristic of interest, for the first community member;
compute, based on the received feedback on the at least one characteristics of interest, a peer review score for the first community member; and
determine, based on the peer review score for the first community member, a rate for insuring the first community member.

9. The first computing device of claim 8, wherein the computer-readable instructions, when executed by the one or more processors, further cause the first computing device to:
adjust, based on the peer review score for the first community member, a price for a product or service offered to the first community member.

10. The first computing device of claim 8, wherein the computer-readable instructions, when executed by the one or more processors, further cause the first computing device to:
adjust, based on the peer review score for the first community member, a price for a product or service offered to the first community member and to each of the plurality of other community members.

11. The first computing device of claim 8, wherein the computer-readable instructions, when executed by the one or more processors, further cause the first computing device to:
determine, based on receiving the feedback from the one or more other community members, a discount or reward to offer the one or more other community members.

12. The first computing device of claim 8, wherein the computer-readable instructions, when executed by the one or more processors, further cause the first computing device to:
aggregate the received feedback; and
send, to a computing device associated with the first community member, the aggregated feedback.

13. The first computing device of claim 8, wherein the computer-readable instructions, when executed by the one or more processors, cause the first computing device to compute the peer review score further based on a length of time that the plurality of other community members connected to the first community member have been associated with the entity.

14. The first computing device of claim 8, wherein the one or more characteristics of interest comprise at least one of: a driving skill, a driving behavior, or a professional skill.

15. A non-transitory, computer-readable storage medium storing instructions that, when executed by a processor of a computing device, cause the computing device to:
generate, using data received from a server hosting a social network website, a social network community graph for an entity, wherein the social network community graph connects the entity to a first community member who is connected to a plurality of other community members;
identify one or more characteristics of interest to the entity;
receive, from one or more second computing devices associated with one or more other community members of the plurality of other community members, feedback on at least one characteristic of interest, of the one or more characteristic of interest, for the first community member;
compute, based on the received feedback on the at least one characteristics of interest, a peer review score for the first community member; and
determine, based on the peer review score for the first community member, a rate for insuring the first community member.

16. The non-transitory, computer-readable storage medium of claim 15, wherein the instructions, when executed by the processor, further cause the computing device to:
adjust, based on the peer review score for the first community member, a price for a product or service offered to the first community member.

17. The non-transitory, computer-readable storage medium of claim 15, wherein the instructions, when executed by the processor, further cause the computing device to:
adjust, based on the peer review score for the first community member, a price for a product or service offered to the first community member and to each of the plurality of other community members.

18. The non-transitory, computer-readable storage medium of claim 15, wherein the instructions, when executed by the processor, further cause the computing device to:
determine, based on receiving the feedback from the one or more other community members, a discount or reward to offer the one or more other community members.

19. The non-transitory, computer-readable storage medium of claim 15, wherein the instructions, when executed by the processor, further cause the computing device to:
aggregate the received feedback; and
send, to a computing device associated with the first community member, the aggregated feedback.

20. The non-transitory, computer-readable storage medium of claim 15, wherein the instructions, when executed by the processor, cause the computing device to compute the peer review score further based on a length of time that the plurality of other community members connected to the first community member have been associated with the entity.

* * * * *